(12) United States Patent
Takagi et al.

(10) Patent No.: US 11,544,483 B2
(45) Date of Patent: Jan. 3, 2023

(54) DETECTION SYSTEM, TRANSPORT SYSTEM, DETECTION METHOD, AND DETECTION PROGRAM

(71) Applicant: TOYOTA JIDOSHA KABUSHIKI KAISHA, Toyota (JP)

(72) Inventors: Yutaro Takagi, Tokyo (JP); Kunihiro Iwamoto, Nagakute (JP); Yuta Itozawa, Nagoya (JP); Hirotaka Komura, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/521,035

(22) Filed: Nov. 8, 2021

(65) Prior Publication Data

US 2022/0237394 A1   Jul. 28, 2022

(30) Foreign Application Priority Data

Jan. 26, 2021   (JP) .............................. JP2021-010237

(51) Int. Cl.
*G06K 7/10*   (2006.01)

(52) U.S. Cl.
CPC ................................ *G06K 7/10366* (2013.01)

(58) Field of Classification Search
CPC ................................................... G06K 7/10366
USPC ......................................................... 235/385
See application file for complete search history.

(56) References Cited

U.S. PATENT DOCUMENTS

| 9,977,865 | B1* | 5/2018 | LaBorde | G06K 7/10366 |
| 2015/0097653 | A1* | 4/2015 | Gibbs | G01S 5/0278 340/10.1 |
| 2019/0247276 | A1 | 8/2019 | Mongrenier | |

FOREIGN PATENT DOCUMENTS

| JP | H05270618 A | 10/1993 |
| JP | 2017027165 A | 2/2017 |
| JP | 2019153217 A | 9/2019 |
| JP | 2020500041 A | 1/2020 |

\* cited by examiner

*Primary Examiner* — Jamara A Franklin
(74) *Attorney, Agent, or Firm* — Dickinson Wright, PLLC

(57) ABSTRACT

A detection system according to an embodiment of the present disclosure includes: a plurality of proximity sensors provided in a mounting portion of a transport robot; an information acquisition unit that is provided in the mounting portion of the transport robot and that acquires information from an integrated circuit (IC) tag provided in a standard object; and an estimation unit that estimates a placement status of the standard object based on detection results of the proximity sensors and an acquisition result of the information acquisition unit.

8 Claims, 8 Drawing Sheets

DETECTION SYSTEM, TRANSPORT SYSTEM, DETECTION METHOD, AND DETECTION PROGRAM

CROSS-REFERENCE TO RELATED APPLICATION

This application claims priority to Japanese Patent Application No. 2021-010237 filed on Jan. 26, 2021, incorporated herein by reference in its entirety.

BACKGROUND

1. Technical Field

The present disclosure relates to a detection system, a transport system, a detection method, and a detection program, and relates to, for example, a detection system, a transport system, a detection method, and a detection program for detecting a standard object placed on a mounting portion of a transport robot.

2. Description of Related Art

In recent years, in factories, warehouses, and the like, a standard object is placed on a mounting portion of a transport robot to be transported. Japanese Unexamined Patent Application Publication No. 2019-153217 (JP 2019-153217 A) discloses a trolley capable of reading information from an integrated circuit (IC) tag embedded in a floor surface and writing information to the IC tag.

SUMMARY

The applicant has found the following issue. When a standard object is placed on a mounting portion of a transport system to be transported, it is desirable that the standard object be placed in a preset area of the mounting portion. However, it has been difficult to estimate a placement status of the standard object.

The present disclosure has been made in view of the above issue, and realizes a detection system, a transport system, a detection method, and a detection program that enables estimation of a placement status of a standard object placed on a mounting portion of a transport robot.

A first aspect of the present disclosure relates to a detection system that detects a standard object placed on a mounting portion of a transport robot. The detection system includes: a plurality of proximity sensors provided in the mounting portion; an information acquisition unit that is provided in the mounting portion and that acquires information from an IC tag provided in the standard object; an estimation unit that estimates a placement status of the standard object based on detection results of the proximity sensors and an acquisition result of the information acquisition unit, wherein: the proximity sensors are provided such that when the standard object is placed in a preset area of the mounting portion, all the proximity sensors detect the standard object, and when the standard object is not placed in the preset area of the mounting portion, any of the proximity sensors does not detect the standard object; and the information acquisition unit is provided so as to acquire the information from the IC tag when the standard object is placed in the preset area of the mounting portion and so as not to acquire the information from the IC tag when the standard object is not placed in the preset area of the mounting portion.

In the above detection system, when all the proximity sensors detect the standard object and the information acquisition unit acquires the information from the IC tag, the estimation unit may estimate that the standard object has been placed in the preset area.

In the above detection system, when any of the proximity sensors does not detect the standard object and the information acquisition unit acquires the information from the IC tag, the estimation unit may estimate that the standard object is placed in the preset area and the proximity sensor that did not detect the standard object is abnormal.

In the above detection system, when all the proximity sensors detect the standard object and the information acquisition unit does not acquire the information from the IC tag, the estimation unit may estimate that the standard object is placed in the preset area and the information acquisition unit is abnormal.

In the above detection system, when any of the proximity sensors does not detect the standard object and the information acquisition unit does not acquire the information from the IC tag, the estimation unit may estimate that the standard object is not placed in the preset area or the proximity sensor that did not detect the standard object and the information acquisition unit are abnormal.

The above detection system may further include a plurality of weight sensors provided in the mounting portion, wherein: the weight sensors may be provided such that when the standard object is placed in the preset area of the mounting portion, all the weight sensors measure a weight of the standard object, and when the standard object is not placed in the preset area of the mounting portion, any of the weight sensors does not measure the weight of the standard object; when all the weight sensors measure the weight of the standard object while any of the proximity sensors does not detect the standard object or the information acquisition unit does not acquire the information from the IC tag, the estimation unit may estimate that the proximity sensor that did not detect the standard object or the information acquisition unit is abnormal; and when any of the proximity sensors does not detect the standard object, the information acquisition unit does not acquire the information from the IC tag, and any of the weight sensors does not detect the weight of the standard object, the estimation unit may estimate that the standard object is not placed in the preset area.

A second aspect of the present disclosure relates to a transport system. The transport system include: the detection system; and the transport robot.

In the above transport system, when the estimation unit of the detection system estimates that the standard object has been placed in the preset area, movement of the transport robot may be permitted.

A third aspect of the present disclosure relates to a detection method for detecting a standard object placed on a mounting portion of a transport robot. The detection method includes: a step in which a plurality of proximity sensors provided in the mounting portion attempts to detect the standard object such that when the standard object is placed in a preset area of the mounting portion, all the proximity sensors detect the standard object, and when the standard object is not placed in the preset area of the mounting portion, any of the proximity sensors does not detect the standard object; a step in which an information acquisition unit provided in the mounting portion attempts to acquire information from an IC tag provided in the standard object such that when the standard object is placed in the preset area of the mounting portion, the information acquisition unit acquires the information from the IC tag, and when the standard object is not placed in the preset area of the mounting portion, the information acquisition unit does not acquire the information from the IC tag; and a step in which a placement status of the standard object is estimated based on detection results of the proximity sensors and an acquisition result of the information acquisition unit.

A fourth aspect of the present disclosure relates to a detection program for detecting a standard object placed on a mounting portion of a transport robot. The detection program causes a computer to execute: a process in which a plurality of proximity sensors provided in the mounting portion attempts to detect the standard object such that when the standard object is placed in a preset area of the mounting portion, all the proximity sensors detect the standard object, and when the standard object is not placed in the preset area of the mounting portion, any of the proximity sensors does not detect the standard object; a process in which an information acquisition unit provided in the mounting portion attempts to acquire information from an IC tag provided in the standard object such that when the standard object is placed in the preset area of the mounting portion, the information acquisition unit acquires the information from the IC tag, and when the standard object is not placed in the preset area of the mounting portion, the information acquisition unit does not acquire the information from the IC tag; and a process in which a placement status of the standard object is estimated based on detection results of the proximity sensors and an acquisition result of the information acquisition unit.

According to the present disclosure, it is possible to realize a detection system, a transport system, a detection method, and a detection program that enables estimation of a placement status of a standard object placed on a mounting portion of a transport robot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments to which the present disclosure is applied will be described in detail with reference to the drawings. However, the present disclosure is not limited to the following embodiments. Further, in order to clarify the explanation, the following description and drawings are simplified as appropriate.

First Embodiment

Figure 1:
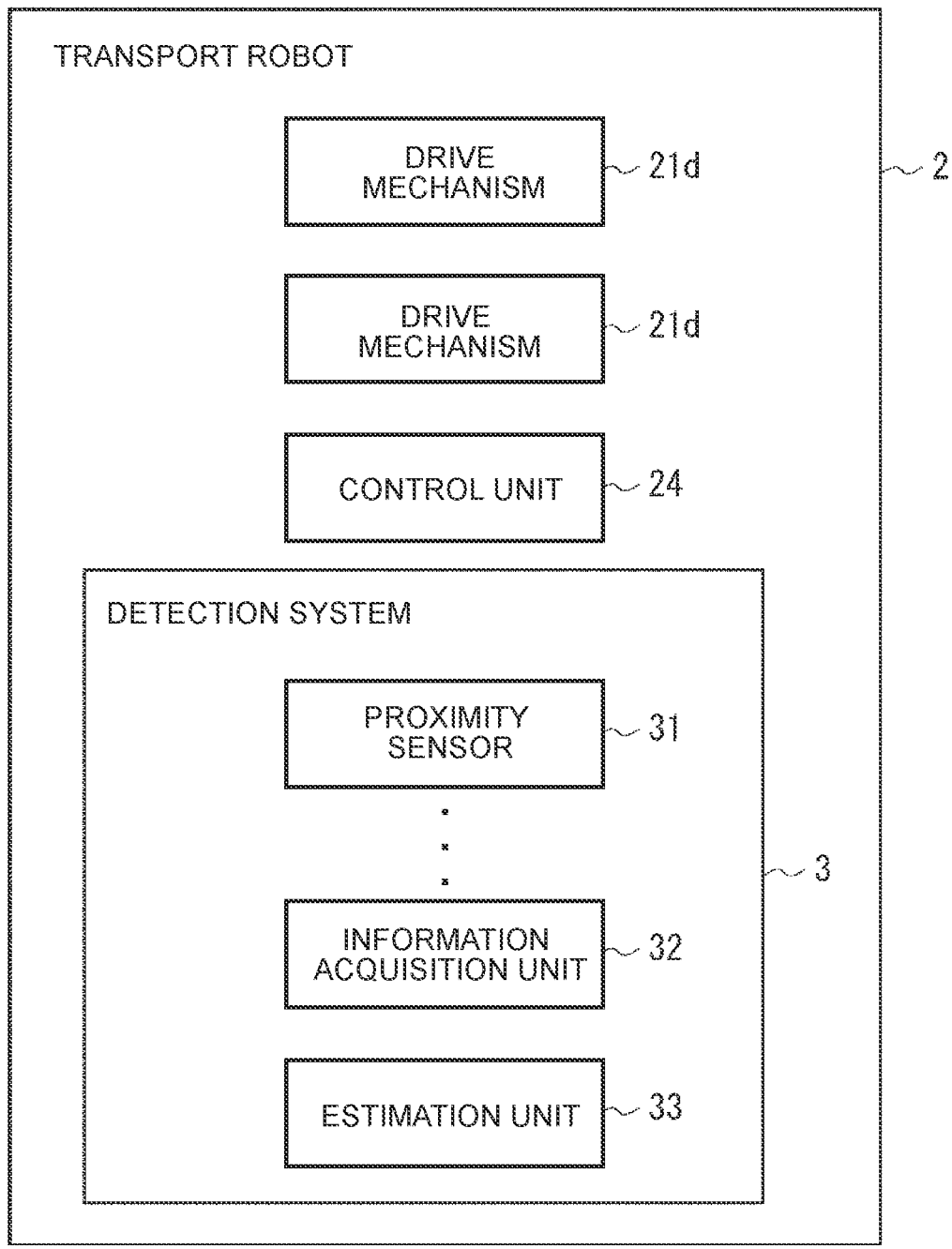
FIG. 1 is a block diagram showing a control system of a transport system of a first embodiment.
Figure 2:
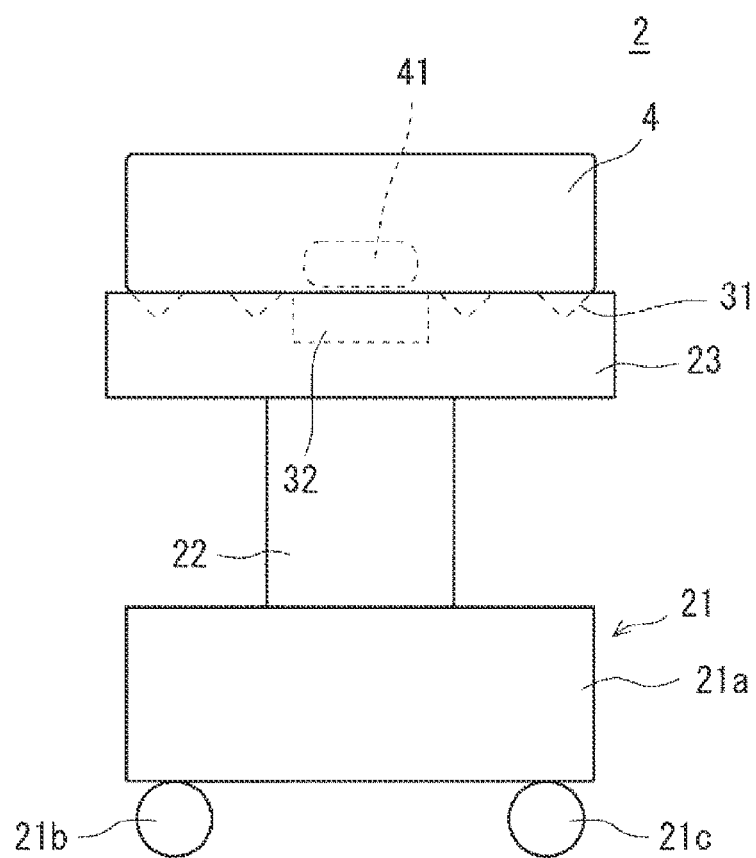
FIG. 2 is a side view schematically showing a transport robot of the first embodiment.
Figure 3:
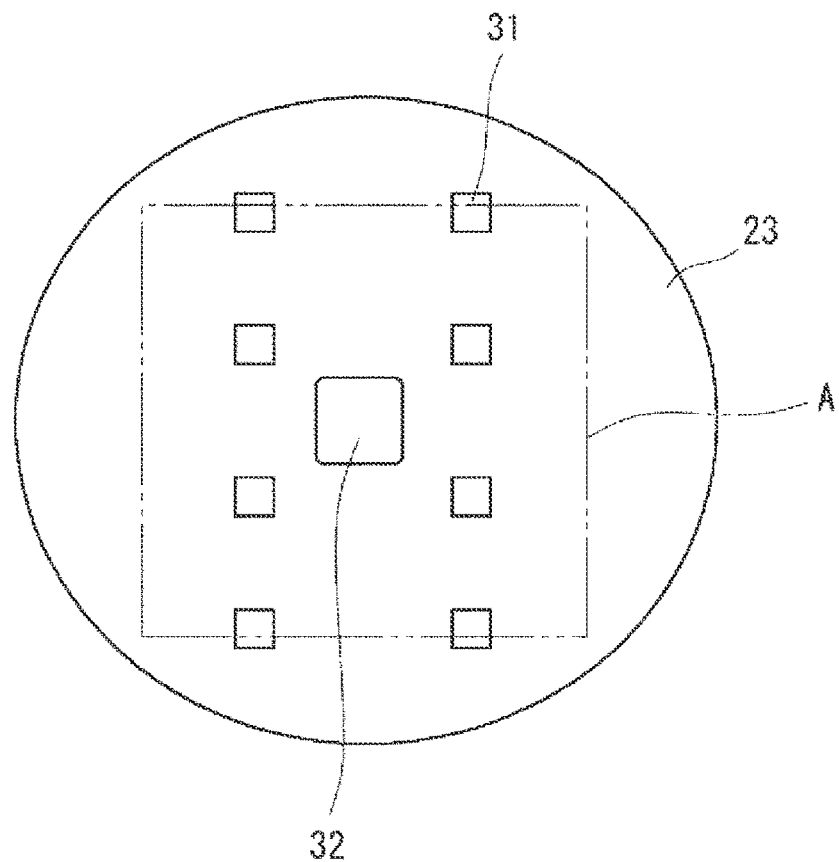
FIG. 3 is a plan view showing an arrangement of proximity sensors and an information acquisition unit in a detection system of the first embodiment.

A transport system of the present embodiment is suitable for transporting a standard object placed on a mounting portion of a transport robot, for example. FIG. 1 is a block diagram showing a control system of a transport system of the present embodiment. FIG. 2 is a side view schematically showing a transport robot of the present embodiment. FIG. 3 is a plan view showing an arrangement of proximity sensors and an information acquisition unit in a detection system of the present embodiment. Note that FIG. 2 shows a state in which the standard object is placed on the mounting portion of the transport robot.

As shown in FIG. 1, the transport system 1 includes a transport robot 2 and a detection system 3. The transport robot 2 is, for example, an autonomous mobile robot. As shown in FIGS. 1 to 3, the transport robot 2 includes a moving portion 21, a support portion 22, a mounting portion 23, and a control unit 24.

As shown in FIGS. 1 and 2, the moving portion 21 includes a robot body 21a, a pair of drive wheels 21b and driven wheels 21c that are rotatably provided to the robot body 21a, and a pair of drive mechanisms 21d that drives the rotation of the drive wheels 21b.

The drive mechanisms 21d each include a motor, a speed reducer, and the like. The drive mechanisms 21d drive the drive wheels 21b to rotate based on control information received from the control unit 24, thereby enabling forward movement, backward movement, and rotation of the robot body 21a.

With this configuration, the robot body 21a can move to a given position. The configuration of the moving portion 21 is an example, and the present disclosure is not limited to this. For example, the numbers of the drive wheels 21b and the driven wheels 21c of the moving portion 21 may be set as appropriate, and a known mechanism can be used as long as the robot body 21a can be moved to a given position.

The support portion 22 projects upward from the robot body 21a. The support portion 22 is composed of, for example, a telescopic extension/retraction mechanism and can be extended and retracted in the vertical direction. The mounting portion 23 is fixed to the upper end portion of the support portion 22, and the upper surface of the mounting portion 23 has a flat surface on which the standard object 4 is placed.

The control unit 24 controls the operation of the transport robot 2 based on the estimation result of the detection system 3. The control unit 24 transmits the control information to the drive mechanisms 21d of the moving portion 21 so as to control the rotation of each drive wheel 21b, thereby moving the robot body 21a to a given position.

As described above, the control unit 24 may control movement of the transport robot 2 by executing known control such as feedback control and robust control based on rotation information of the drive wheels 21b that is detected by rotation sensors provided to the drive wheels 21b.

Further, the control unit 24 may cause the transport robot 2 to move autonomously by controlling the moving portion 21 based on information such as distance information detected by a distance sensor such as a camera or an ultrasonic sensor that is provided to the transport robot 2 and map information of moving environment.

The transport robot 2 may be provided with an arm mechanism for carrying the standard object 4 onto the mounting portion 23 and carrying out the standard object 4 from the mounting portion 23. However, the method of carrying the standard object 4 onto the mounting portion 23 of the transport robot 2 and carrying out the standard object 4 from the mounting portion 23 is not limited, and may be executed by a person.

The standard object 4 is a box capable of accommodating an object therein, and has a predetermined shape. The standard object 4 has, for example, a hollow substantially quadrangular prism shape. However, the standard object 4 only needs to have such a shape that the object can be accommodated in the standard object 4, and may be, for example, a hollow polygonal prism shape or a cylindrical shape.

The standard object 4 is provided with an integrated circuit (IC) tag 41. The IC tag 41 may be provided at the bottom of the standard object 4, for example. The IC tag 41 stores, for example, information about an object accommodated in the standard object 4.

As shown in FIG. 1, the detection system 3 includes a plurality of proximity sensors 31, an information acquisition unit 32, and an estimation unit 33, and is mounted on, for example, the transport robot 2. The proximity sensors 31 can be composed of general proximity sensors such as sensors of an inductive type, a capacitance type, an ultrasonic type, an infrared type, or the like. The proximity sensors 31 can also be composed of contact sensors.

The proximity sensors 31 are provided in the mounting portion 23 such that when the standard object 4 is placed in a preset area A (see FIG. 3) of the mounting portion 23 of the transport robot 2, all the proximity sensors 31 can detect the standard object 4, and when the standard object 4 is placed at a position deviated (that is, offset) from the area A of the mounting portion 23 of the transport robot 2, any of the proximity sensors 31 (for example, the proximity sensor 31 having a detection range partially overlapping an area in the area A that is exposed due to the offset placement of the standard object 4) cannot detect the standard object 4.

Here, the preset area A is, for example, a rectangular area that is defined on the upper surface of the mounting portion 23 of the transport robot 2 and that is somewhat larger than the peripheral edge of the standard object 4 when the standard object 4 is seen in the vertical direction, as shown in FIG. 3. The center of gravity of such a preset area A may be disposed on the central axis of the support portion 22. In FIG. 3, the area A is indicated by a double-dotted chain line.

For example, as shown in FIG. 3, two sets of sensors are arranged in the area A so as to be spaced in the right-left direction of the transport robot 2. Each of the sets includes four proximity sensors 31 that are arranged so as to be spaced in the front-rear direction of the transport robot 2. The proximity sensors 31 of the two sets of sensors face each other in the right-left direction of the transport robot 2.

However, the preset area A can be appropriately changed depending on the shape of the standard object 4 and the like. In terms of the number and arrangement of the proximity sensors 31, the proximity sensors 31 may be provided in the mounting portion 23 such that when the standard object 4 is placed in the area A of the mounting portion 23 of the transport robot 2, all the proximity sensors 31 can detect the standard object 4, and when the standard object 4 is placed at a position deviated from the area A, any of the proximity sensors 31 cannot detect the standard object 4. The number and arrangement of the proximity sensors 31 can be appropriately changed depending on the shapes of the area A and the standard object 4, the detection range of the proximity sensors 31 and the like.

The information acquisition unit 32 acquires the information written in the IC tag 41. The IC tag 41 can be composed of a general tag reader. The information acquisition unit 32 is provided in the mounting portion 23 such that when the standard object 4 is placed in the area A of the mounting portion 23 of the transport robot 2, the information acquisition unit 32 can acquire the information from the IC tag 41, and when the standard object 4 is placed at a position deviated from the area A, the information acquisition unit 32 cannot acquire the information from the IC tag 41.

For example, the information acquisition unit 32 is provided in the mounting portion 23 so as to face the IC tag 41 in the vertical direction of the transport robot 2 when the standard object 4 is placed in the area A of the mounting portion 23 of the transport robot 2, as shown in FIG. 2.

However, the information acquisition unit 32 only needs to be provided in the mounting portion 23 such that when the standard object 4 is placed in the area A of the mounting portion 23 of the transport robot 2, the information acquisition unit 32 can acquire the information from the IC tag 41, and when the standard object 4 is placed at a position deviated from the area A, the information acquisition unit 32 cannot acquire the information from the IC tag 41. The way of providing the information acquisition unit 32 may be appropriately changed depending on the position of the IC tag 41, the acquisition range of the information acquisition unit 32, and the like when the standard object 4 is placed in the area A of the mounting portion 23 of the transport robot 2.

Although details will be described later, the estimation unit 33 estimates a placement status of the standard object 4 based on the detection results of the proximity sensors 31 and the acquisition result of the information acquisition unit 32.

Figure 4:
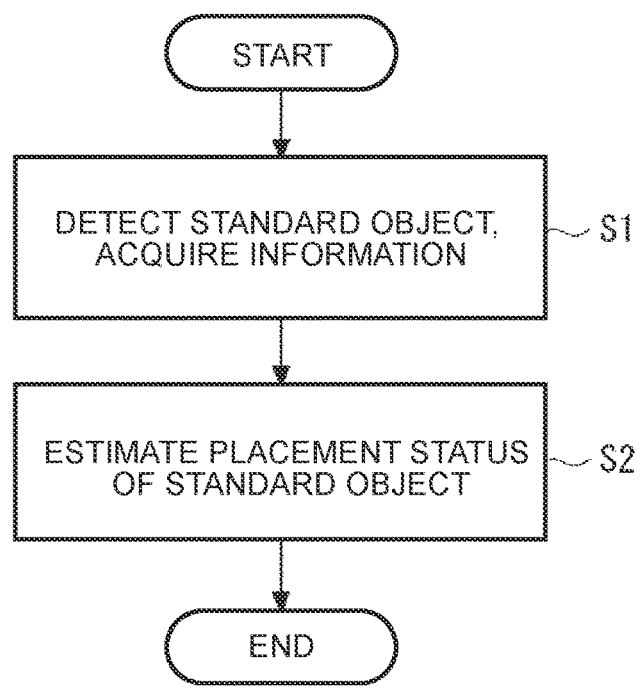
FIG. 4 is a flowchart showing a flow of determining a placement status of a standard object when the standard object is transported using the transport system of the first embodiment.

Next, a flow of determining the placement status of the standard object 4 when the standard object 4 is transported using the transport system 1 of the present embodiment will be described. FIG. 4 is a flowchart showing a flow of determining the placement status of the standard object when the standard object is transported using the transport system of the present embodiment.

For example, when a person places the standard object 4 on the mounting portion 23 of the transport robot 2, all the proximity sensors 31 of the detection system 3 attempt to detect the standard object 4, and the information acquisition unit 32 attempts to acquire the information from the IC tag 41 (S1). Then, all the proximity sensors 31 output the information indicating the detection results to the estimation unit 33, and the information acquisition unit 32 outputs the information indicating the acquisition result to the estimation unit 33.

Next, the estimation unit 33 of the detection system 3 estimates the placement status of the standard object 4 based on the detection results of all the proximity sensors 31 and the acquisition result of the information acquisition unit 32 that are indicated by the above information (S2). Specifically, the estimation unit 33 determines whether all the proximity sensors 31 have detected the standard object 4, and whether the information acquisition unit 32 has acquired the information from the IC tag 41.

When all the proximity sensors 31 detect the standard object 4 and the information acquisition unit 32 acquires the information from the IC tag 41, the estimation unit 33 estimates that the standard object 4 has been placed in the area A of the mounting portion 23 of the transport robot 2.

The estimation unit 33 of the detection system 3 outputs information indicating the determination result that the standard object 4 has been placed in the area A of the mounting portion 23 of the transport robot 2, to the control unit 24 of the transport robot 2. The control unit 24 of the transport robot 2 controls the drive mechanisms 21d of the moving portion 21 such that, for example, the transport robot 2 moves to a given position, based on the determination result that the standard object 4 has been placed in the area A of the mounting portion 23 of the transport robot 2, which is indicated by the above information.

That is, the control unit 24 of the transport robot 2 permits the operation of the transport robot 2 based on the determination result that the standard object 4 has been placed in the area A of the mounting portion 23 of the transport robot 2, which is indicated by the above information.

When any of the proximity sensors 31 does not detect the standard object 4 but the information acquisition unit 32 acquires the information from the IC tag 41, the estimation unit 33 estimates that the standard object 4 has been placed in the area A of the mounting portion 23 of the transport robot 2 and estimates that the proximity sensor 31 that did not detect the standard object 4 is abnormal.

That is, since the information acquisition unit 32 that is provided so as to be able to acquire the information from the IC tag 41 when the standard object 4 is placed in the area A of the mounting portion 23 of the transport robot 2 acquires the information from the IC tag 41, the estimation unit 33 can estimate that the standard object 4 has been placed in the area A of the mounting portion 23 of the transport robot 2.

On the other hand, the proximity sensors 31 are provided such that when the standard object 4 is placed in the area A of the mounting portion 23 of the transport robot 2, all the proximity sensors 31 can detect the standard object 4. Therefore, when the standard object 4 is placed in the area A of the mounting portion 23 of the transport robot 2 but any of the proximity sensors 31 does not detect the standard object 4, the estimation unit 33 can estimate that the proximity sensor 31 that did not detect the standard object 4 is abnormal.

The estimation unit 33 of the detection system 3 outputs the information indicating the determination result that an abnormality has occurred in the proximity sensor 31, to the control unit 24 of the transport robot 2. The control unit 24 of the transport robot 2 controls the drive mechanisms 21d of the moving portion 21 such that, for example, the transport robot 2 does not move to a given position, based on the determination result that an abnormality has occurred in the proximity sensor 31, which is indicated by the above information. That is, the control unit 24 of the transport robot 2 does not permit the operation of the transport robot 2 based on the determination result that an abnormality has occurred in the proximity sensor 31, which is indicated by that information.

When all the proximity sensors 31 detect the standard object 4 but the information acquisition unit 32 does not acquire the information from the IC tag 41, the estimation unit 33 estimates that the standard object 4 has been placed in the area A of the mounting portion 23 of the transport robot 2 and the information acquisition unit 32 is abnormal.

That is, since all the proximity sensors 31 that are provided so as to be able to detect the standard object 4 when the standard object 4 is placed in the area A of the mounting portion 23 of the transport robot 2 detect the standard object 4, the estimation unit 33 can estimate that the standard object 4 has been placed in the area A of the mounting portion 23 of the transport robot 2.

On the other hand, the information acquisition unit 32 is provided so as to be able to acquire the information from the IC tag 41 when the standard object 4 is placed in the area A of the mounting portion 23 of the transport robot 2. Therefore, when the standard object 4 is placed in the area A of the mounting portion 23 of the transport robot 2 but the information acquisition unit 32 does not acquire the information from the IC tag 41, the estimation unit 33 estimates that the information acquisition unit 32 is abnormal.

The estimation unit 33 of the detection system 3 outputs the information indicating the determination result that an abnormality has occurred in the information acquisition unit 32, to the control unit 24 of the transport robot 2. The control unit 24 of the transport robot 2 controls the drive mechanisms 21d of the moving portion 21 such that, for example, the transport robot 2 does not move to a given position, based on the determination result that an abnormality has occurred in the information acquisition unit 32, which is indicated by the above information. That is, the control unit 24 of the transport robot 2 does not permit the operation of the transport robot 2 based on the determination result that an abnormality has occurred in the information acquisition unit 32, which is indicated by the above information.

When any of the proximity sensors 31 does not detect the standard object 4 and the information acquisition unit 32 does not acquire the information from the IC tag 41, the estimation unit 33 estimates that the standard object 4 is not placed in the area A of the mounting portion 23 of the transport robot 2 or the proximity sensor 31 that did not detect the standard object 4 and the information acquisition unit 32 are abnormal.

That is, the proximity sensors 31 and the information acquisition unit 32 are provided such that when the standard object 4 is placed in the area A of the mounting portion 23 of the transport robot 2, all the proximity sensors 31 can detect the standard object 4 and the information acquisition unit 32 can acquire the information from the IC tag 41. Therefore, when any of the proximity sensors 31 does not detect the standard object 4 and the information acquisition unit 32 does not acquire the information from the IC tag 41, the estimation unit 33 can estimate that the standard object 4 is not placed in the area A of the mounting portion 23 of the transport robot 2.

On the other hand, there is a possibility that the standard object 4 is placed in the area A of the mounting portion 23 of the transport robot 2 but any of the proximity sensors 31 does not detect the standard object 4 and the information acquisition unit 32 does not acquire the information from the IC tag 41 due to abnormalities in the proximity sensor 31 and the information acquisition unit 32. Therefore, the estimation unit 33 can also estimate that the proximity sensor 31 that did not detect the standard object 4 and the information acquisition unit 32 are abnormal.

The estimation unit 33 of the detection system 3 outputs, to the control unit 24 of the transport robot 2, information indicating the determination result that the standard object 4 is not placed in the area A of the mounting portion 23 of the transport robot 2 or abnormalities have occurred in the proximity sensor 31 that did not detect the standard object 4 and the information acquisition unit 32. That is, the estimation unit 33 does not specify either one of whether the standard object 4 is not placed in the area A of the mounting portion 23 of the transport robot 2 and whether abnormalities have occurred in the proximity sensor 31 that did not detect the standard object 4 and the information acquisition unit 32.

The control unit 24 of the transport robot 2 controls the drive mechanisms 21d of the moving portion 21 such that, for example, the transport robot 2 does not move to a given position, based on the determination result that the standard object 4 is not placed in the area A of the mounting portion 23 of the transport robot 2 or abnormalities have occurred in the proximity sensor 31 that did not detect the standard object 4 and the information acquisition unit 32, which is indicated by the above information.

That is, the control unit 24 of the transport robot 2 does not permit the operation of the transport robot 2, based on the determination result that the standard object 4 is not placed in the area A of the mounting portion 23 of the transport robot 2 or abnormalities have occurred in the proximity sensor 31 that did not detect the standard object 4 and the information acquisition unit 32, which is indicated by the above information.

As described above, with the detection system 3, the transport system 1, and the detection method of the present embodiment, it is possible to estimate that the standard object 4 has been placed in the area A of the mounting portion 23 of the transport robot 2 using the proximity sensors 31 and the information acquisition unit 32. That is, the placement status of the standard object 4 can be estimated.

Moreover, by combining the detection results of the proximity sensors 31 and the acquisition result of the information acquisition unit 32, it is possible to easily estimate that the standard object 4 has been appropriately placed in the area A of the mounting portion 23 of the transport robot 2.

Further, in the detection system 3, the transport system 1, and the detection method of the present embodiment, by combining the detection results of the proximity sensors 31 and the acquisition result of the information acquisition unit 32, it is possible to easily estimate that an abnormality has occurred in the proximity sensor 31 or the information acquisition unit 32. Therefore, it is easy to replace the proximity sensor 31 or the information acquisition unit 32 in which an abnormality has occurred.

Further, in the detection system 3, the transport system 1, and the detection method of the present embodiment, when any of the proximity sensors 31 does not detect the standard object 4 and the information acquisition unit 32 does not acquire the information from the IC tag 41, it is possible to estimate that the standard object 4 is not placed in the area A of the mounting portion 23 of the transport robot 2 or the proximity sensor 31 that did not detect the standard object 4 and the information acquisition unit 32 are abnormal. That is, by combining the detection results of the proximity sensors 31 and the acquisition result of the information acquisition unit 32, it is possible to easily estimate that some kind of abnormality has occurred.

Second Embodiment

Figure 5:
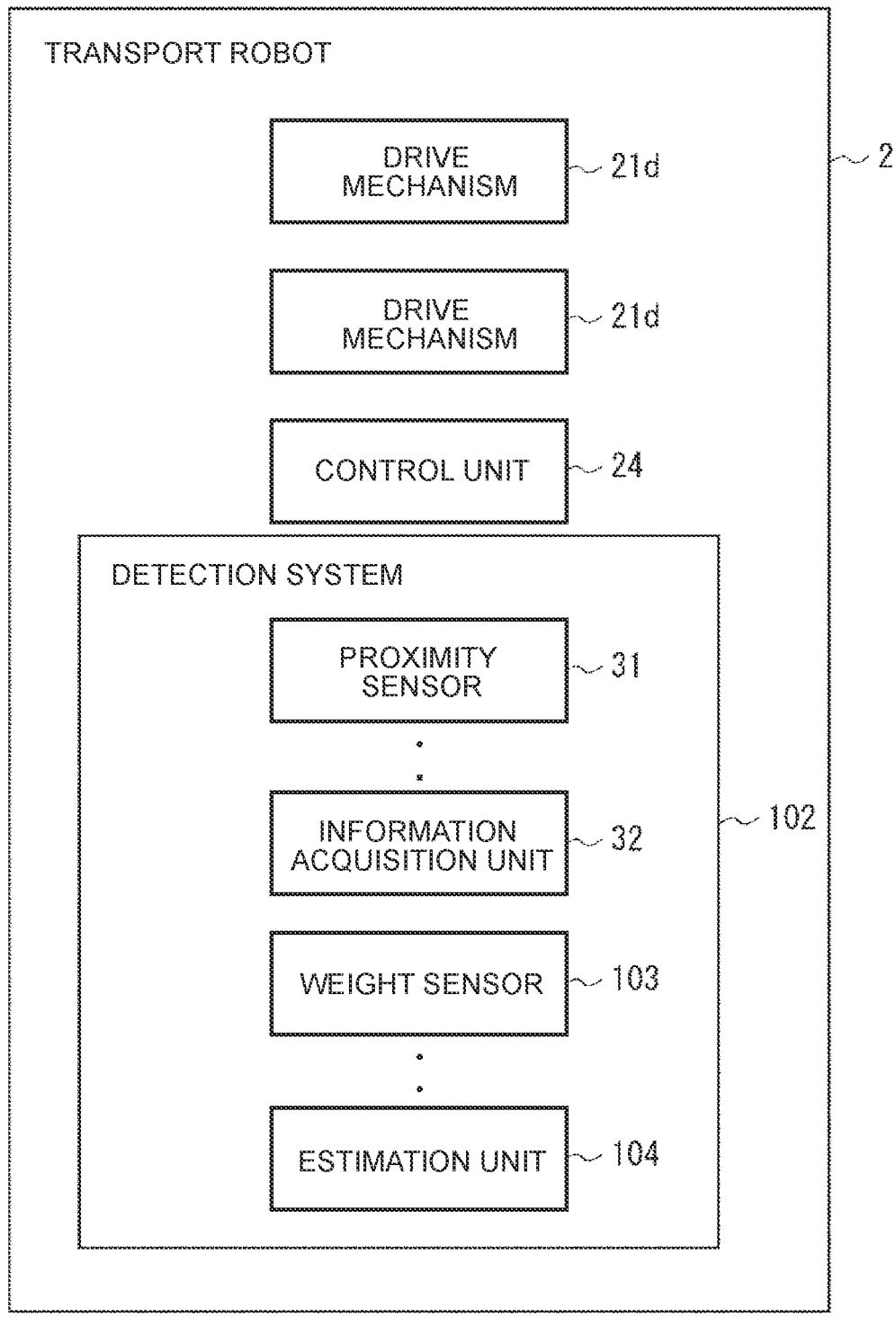
FIG. 5 is a block diagram showing a control system of a transport system of a second embodiment.
Figure 6:
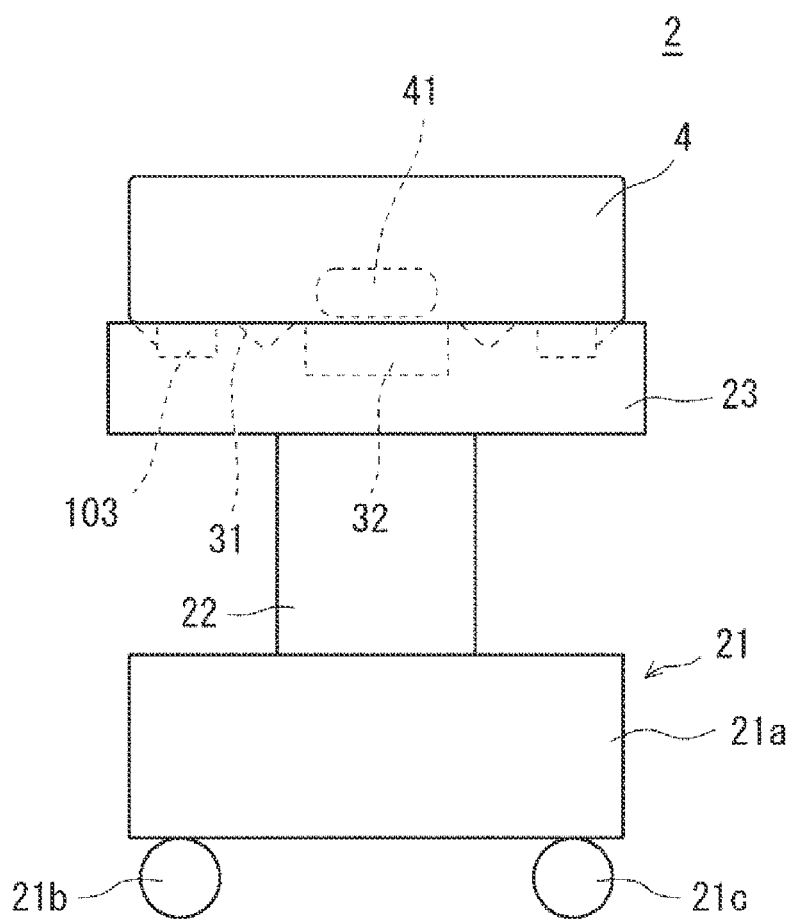
FIG. 6 is a side view schematically showing a transport robot of the second embodiment.
Figure 7:
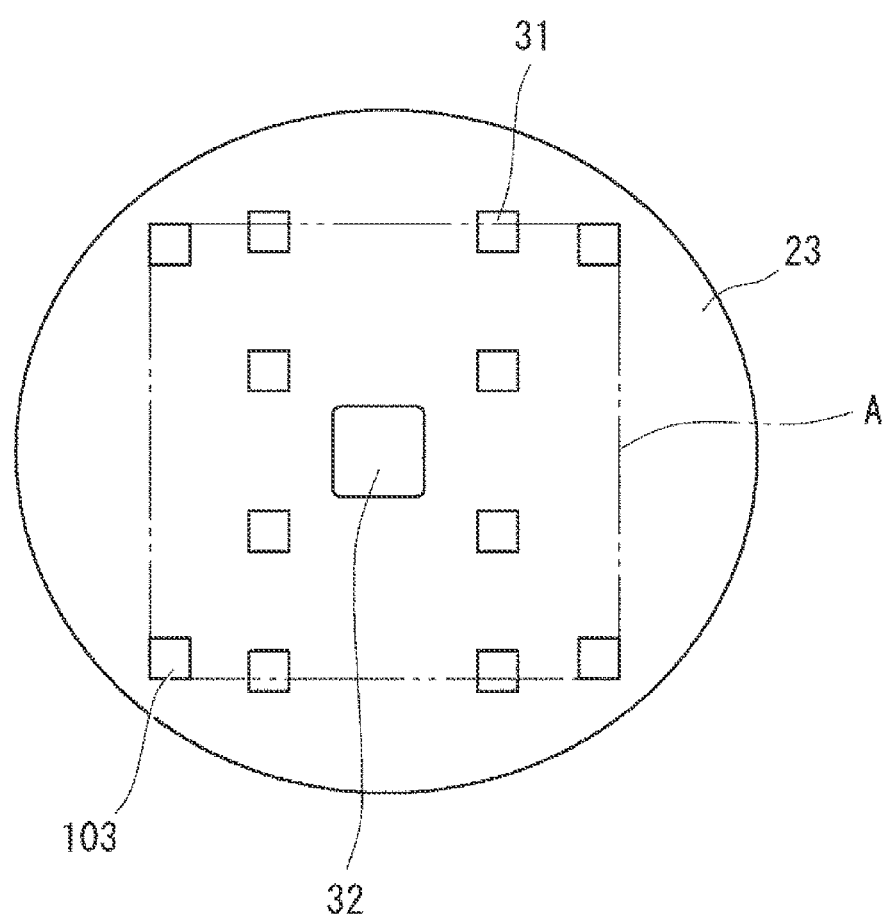
FIG. 7 is a plan view showing an arrangement of proximity sensors, an information acquisition unit, and weight sensors in a detection system of the second embodiment.

FIG. 5 is a block diagram showing a control system of a transport system of the present embodiment. FIG. 6 is a side view schematically showing a transport robot of the present embodiment. FIG. 7 is a plan view showing an arrangement of proximity sensors, an information acquisition unit, and weight sensors in the detection system of the present embodiment. Note that FIG. 6 shows a state in which the standard object is placed on the mounting portion of the transport robot.

A transport system 101 of the present embodiment has substantially the same configuration as the transport system 1 of the first embodiment, but the configuration of a detection system 102 is different. The descriptions that overlap those of the first embodiment will be omitted, and the same elements as those of the first embodiment will be described using the same reference signs.

The detection system 102 includes, for example, a plurality of weight sensors 103, as shown in FIG. 5. The weight sensors 103 are provided in the mounting portion 23 such that when the standard object 4 is placed in the area A of the mounting portion 23 of the transport robot 2, all the weight sensors 103 can measure the weight of the standard object 4, and when the standard object 4 is placed at a position deviated from the area A, any of the weight sensors 103 cannot measure the weight of the standard object 4.

For example, as shown in FIGS. 6 and 7, four weight sensors 103 are respectively disposed near the corners of the area A of the mounting portion 23 of the transport robot 2. The weight sensors 103 only need to be provided in the mounting portion 23 such that when the standard object 4 is placed in the area A of the mounting portion 23 of the transport robot 2, all the weight sensors 103 can measure the weight of the standard object 4, and when the standard object 4 is placed at a position deviated from the area A, any of the weight sensors 103 cannot measure the weight of the standard object 4. The number and arrangement of the weight sensors 103 can be appropriately changed depending on the shape of the area A of the mounting portion 23 of the transport robot 2 and the measurement range of the weight sensors 103.

The weight sensors 103 are thus provided in the mounting portion 23. Thereby, when all the weight sensors 103 measure the weight of the standard object 4 but any of the proximity sensors 31 does not detect the standard object 4 or the information acquisition unit 32 does not acquire the information from the IC tag 41, the estimation unit 104 can estimate that the standard object 4 has been placed in the area A of the mounting portion 23 of the transport robot 2 and can estimate that the proximity sensor 31 that did not detect the standard object 4 or the information acquisition unit 32 is abnormal.

On the other hand, when any of the proximity sensors 31 does not detect the standard object 4, the information acquisition unit 32 does not acquire the information from the IC tag 41, and any of the weight sensors 103 does not measure the weight of the standard object 4, the estimation unit 104 can estimate that the standard object 4 is not placed in the area A of the mounting portion 23 of the transport robot 2.

Thus, the estimation unit 104 of the detection system 102 can specify whether the proximity sensor 31 or the information acquisition unit 32 is abnormal or whether the standard object 4 is not placed in the area A of the mounting portion 23 of the transport robot 2, so an abnormality can be easily identified.

Further, the abnormality in the proximity sensor 31, the information acquisition unit 32, or the weight sensor 103 can be estimated by combining the proximity sensors 31, the information acquisition unit 32, and the weight sensors 103. Thus, the detection system 102 of the present embodiment can improve the accuracy of identifying the abnormality as compared with the detection system 3 of the first embodiment.

Third Embodiment

Figure 8:
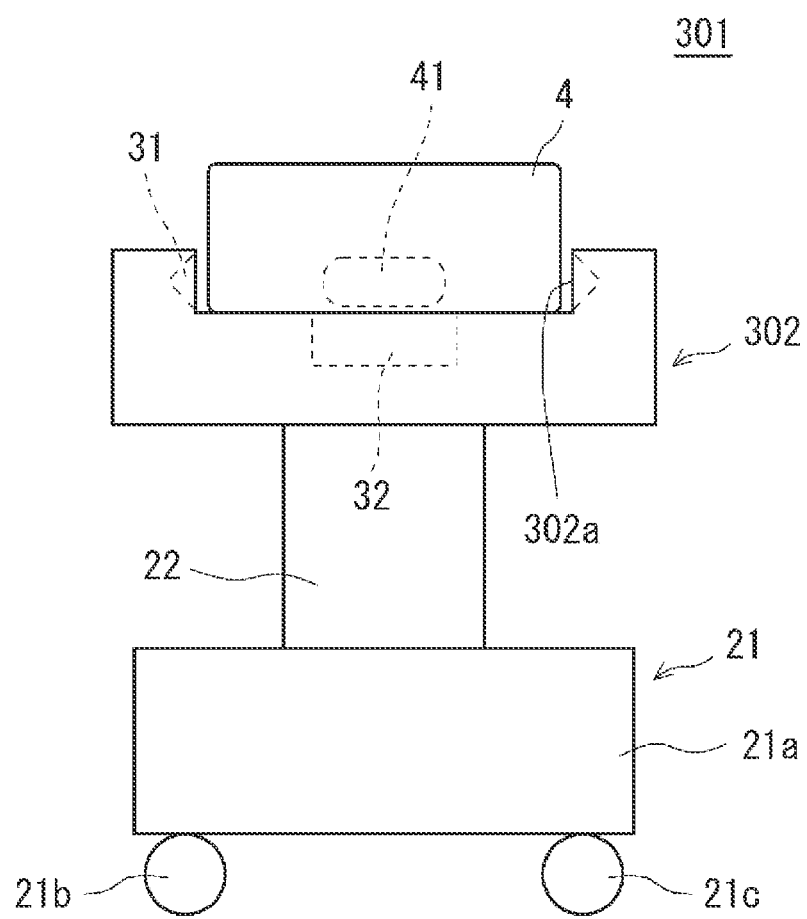
FIG. 8 is a side view schematically showing a transport robot of a third embodiment.
Figure 9:
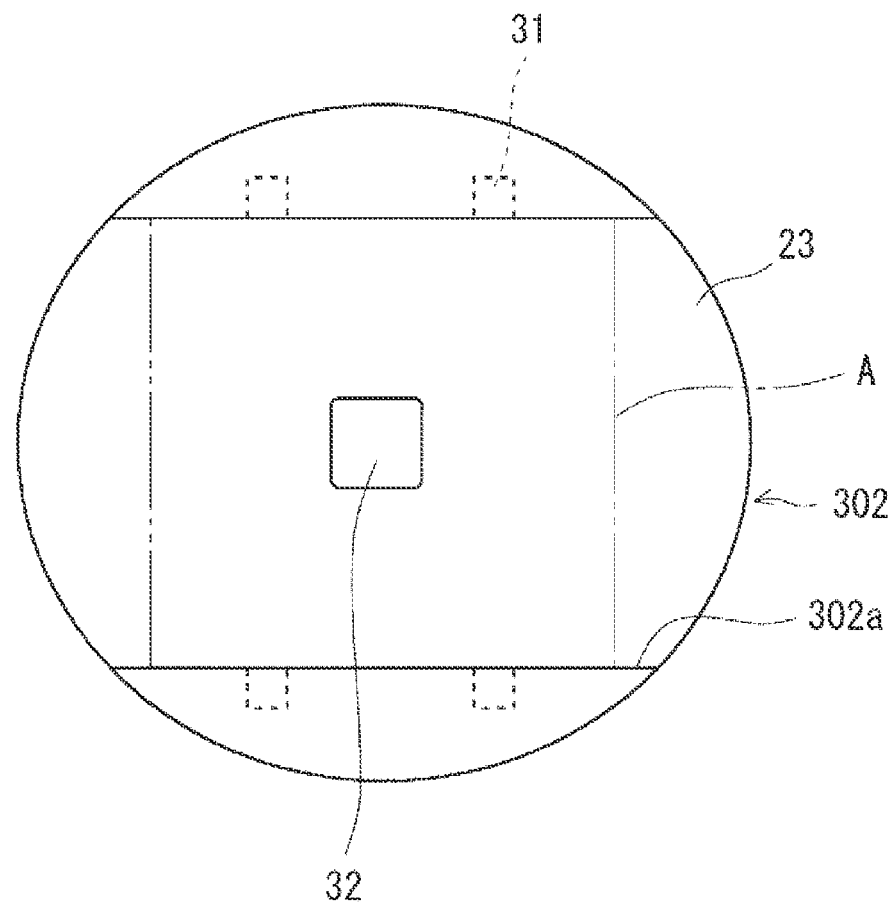
FIG. 9 is a plan view showing an arrangement of proximity sensors and an information acquisition unit in a detection system of the third embodiment.

FIG. 8 is a side view schematically showing a transport robot of the present embodiment. FIG. 9 is a plan view showing an arrangement of proximity sensors and an information acquisition unit in a detection system of the present embodiment.

In the transport robot 2 of the first and second embodiments, the upper surface of the mounting portion 23 is a flat surface. However, when a mounting portion 302 is provided with a recess 302a for fitting the standard object 4 in the mounting portion 302 of a transport robot 301 as shown in FIGS. 8 and 9, the proximity sensors 31 may be provided in the side portions of the recess 302a.

When the recess 302a is provided in the mounting portion 302 in this way, by fitting the standard object 4 into the recess 302a of the mounting portion 302, the standard object 4 can be easily positioned in a preset area of the mounting portion 302 of the transport robot 301.

Other Embodiments

Figure 10:
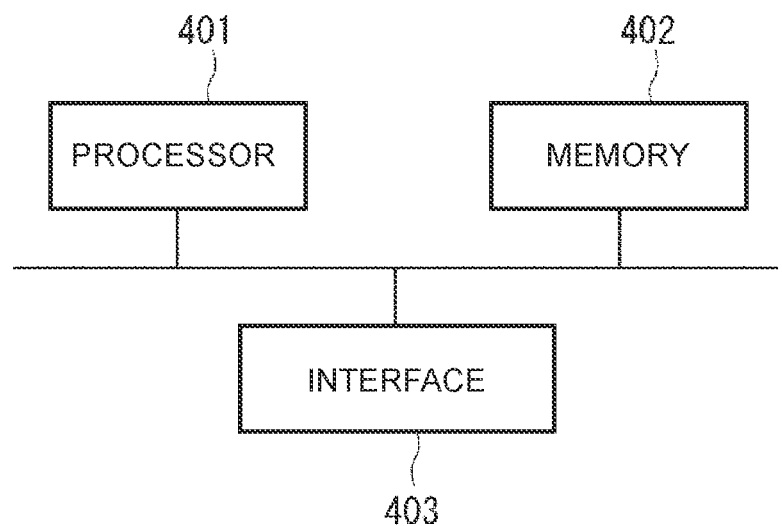
FIG. 10 is a diagram showing an example of the hardware configuration included in the detection system and the transport system.

The detection system and the transport system according to the above embodiments may have the following hardware configuration. FIG. 10 is a diagram showing an example of the hardware configuration included in the detection system and the transport system. As the procedure of processing in the detection system and the transport system has been described in various embodiments above, the present disclosure may also take the form of a detection method.

A control device shown in FIG. 10 includes a processor 401 and a memory 402 together with an interface 403. The configuration of a part of the detection system and the transport system described in the above embodiments is realized as the processor 401 reads and executes a detection program stored in the memory 402. That is, the program is a program for causing the processor 401 to function as the configuration of a part of the detection system and the transport system. It can be said that the program is a program for causing the detection system and the transport system to execute the process in the configuration or a part of the configuration of the detection system and the transport system.

The program described above is stored using various types of non-transitory computer-readable media and can be supplied to a computer (a computer including an information notification device). The non-transitory computer-readable media include various types of tangible storage media. Examples of the non-transitory computer-readable media include magnetic recording media (e.g., flexible disks, magnetic tapes, hard disk drives), magneto-optical recording media (e.g., magneto-optical disks). Further, the examples above include a compact disc read-only memory (CD-ROM), a compact disc recordable (CD-R), and a compact disc rewritable (CD-R/W). Further, the examples above include semiconductor memories (e.g., mask ROM, programmable ROM (PROM), erasable programmable ROM (EPROM), flash ROM, random access memory (RAM)). The program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The present disclosure is not limited to the above embodiments, and can be appropriately modified without departing from the scope thereof.

In the above embodiments, the estimation unit of the detection system is mounted on the transport robot, but the estimation unit may be mounted on a server or the like outside the transport robot.

In the above embodiments, when the standard object 4 is placed in the area A of the mounting portion of the transport robot, the transport robot is permitted to move to a given position, but the permission only needs to be given to the operation of the transport robot.

In the above embodiments, when the standard object 4 is not placed in the preset area A of the mounting portion of the transport robot, the operation of the transport robot is not permitted. However, the operation of the transport robot may be permitted.

In the above embodiments, when an abnormality has occurred in any of the proximity sensor 31, the information acquisition unit 32, or the weight sensor 103, the operation of the transport robot is not permitted. However, the operation of the transport robot may be permitted.

In the above embodiments, the transport robot is composed of an autonomous mobile robot, but may be composed of a robot that moves in response to an instruction from the outside.

What is claimed is:

1. A detection system that detects a standard object placed on a mounting portion of a transport robot, the detection system comprising:
    a plurality of proximity sensors provided in the mounting portion;
    an information acquisition unit that is provided in the mounting portion and that acquires information from an integrated circuit (IC) tag provided in the standard object;
    an estimation unit that estimates a placement status of the standard object based on detection results of the proximity sensors and an acquisition result of the information acquisition unit, wherein:
    the proximity sensors are provided such that when the standard object is placed in a preset area of the mounting portion, all the proximity sensors detect the standard object, and when the standard object is not placed in the preset area of the mounting portion, any of the proximity sensors does not detect the standard object; and
    the information acquisition unit is provided so as to acquire the information from the IC tag when the standard object is placed in the preset area of the mounting portion and so as not to acquire the information from the IC tag when the standard object is not placed in the preset area of the mounting portion.

2. The detection system according to claim 1, wherein when all the proximity sensors detect the standard object and the information acquisition unit acquires the information from the IC tag, the estimation unit estimates that the standard object has been placed in the preset area.

3. The detection system according to claim 1, wherein when any of the proximity sensors does not detect the standard object and the information acquisition unit acquires the information from the IC tag, the estimation unit estimates that the standard object is placed in the preset area and the proximity sensor that did not detect the standard object is abnormal.

4. The detection system according to claim 1, wherein when all the proximity sensors detect the standard object and the information acquisition unit does not acquire the information from the IC tag, the estimation unit estimates that the standard object is placed in the preset area and the information acquisition unit is abnormal.

5. The detection system according to claim 1, wherein when any of the proximity sensors does not detect the standard object and the information acquisition unit does not acquire the information from the IC tag, the estimation unit estimates that the standard object is not placed in the preset area or the proximity sensor that did not detect the standard object and the information acquisition unit are abnormal.

6. The detection system according to claim 1, further comprising a plurality of weight sensors provided in the mounting portion, wherein:
  the weight sensors are provided such that when the standard object is placed in the preset area of the mounting portion, all the weight sensors measure a weight of the standard object, and when the standard object is not placed in the preset area of the mounting portion, any of the weight sensors does not measure the weight of the standard object;
  when all the weight sensors measure the weight of the standard object while any of the proximity sensors does not detect the standard object or the information acquisition unit does not acquire the information from the IC tag, the estimation unit estimates that the proximity sensor that did not detect the standard object or the information acquisition unit is abnormal; and
  when any of the proximity sensors does not detect the standard object, the information acquisition unit does not acquire the information from the IC tag, and any of the weight sensors does not detect the weight of the standard object, the estimation unit estimates that the standard object is not placed in the preset area.

7. A detection method for detecting a standard object placed on a mounting portion of a transport robot, the detection method comprising:
  a step in which a plurality of proximity sensors provided in the mounting portion attempts to detect the standard object such that when the standard object is placed in a preset area of the mounting portion, all the proximity sensors detect the standard object, and when the standard object is not placed in the preset area of the mounting portion, any of the proximity sensors does not detect the standard object;
  a step in which an information acquisition unit provided in the mounting portion attempts to acquire information from an integrated circuit (IC) tag provided in the standard object such that when the standard object is placed in the preset area of the mounting portion, the information acquisition unit acquires the information from the IC tag, and when the standard object is not placed in the preset area of the mounting portion, the information acquisition unit does not acquire the information from the IC tag; and
  a step in which a placement status of the standard object is estimated based on detection results of the proximity sensors and an acquisition result of the information acquisition unit.

8. A detection program for detecting a standard object placed on a mounting portion of a transport robot, the detection program causing a computer to execute:
  a process in which a plurality of proximity sensors provided in the mounting portion attempts to detect the standard object such that when the standard object is placed in a preset area of the mounting portion, all the proximity sensors detect the standard object, and when the standard object is not placed in the preset area of the mounting portion, any of the proximity sensors does not detect the standard object;
  a process in which an information acquisition unit provided in the mounting portion attempts to acquire information from an integrated circuit (IC) tag provided in the standard object such that when the standard object is placed in the preset area of the mounting portion, the information acquisition unit acquires the information from the IC tag, and when the standard object is not placed in the preset area of the mounting portion, the information acquisition unit does not acquire the information from the IC tag; and
  a process in which a placement status of the standard object is estimated based on detection results of the proximity sensors and an acquisition result of the information acquisition unit.

* * * * *